March 12, 1963 R. D. MERRILL ET AL 3,080,681
SEED PLANTER
Filed Dec. 11, 1959 2 Sheets-Sheet 1

INVENTORS
RICHARD MERRILL
MALCOLM L. TINKER
BY
Barlow & Barlow
ATTORNEYS

March 12, 1963  R. D. MERRILL ET AL  3,080,681
SEED PLANTER
Filed Dec. 11, 1959  2 Sheets-Sheet 2

INVENTORS
RICHARD MERRILL
MALCOLM L. TINKER
BY
Barlow & Barlow
ATTORNEYS

United States Patent Office 3,080,681
Patented Mar. 12, 1963

3,080,681
SEED PLANTER
Richard D. Merrill, Attleboro, Mass., and Malcolm L. Tinker, Cresskill, N.J., assignors to Union Wadding Company, a corporation of Rhode Island
Filed Dec. 11, 1959, Ser. No. 859,016
4 Claims. (Cl. 47—56)

This invention relates to a seed planter of the type in which seeds are contained in an article which may be laid on the ground and then either left so positioned or covered over or partly covered with soil.

Heretofore in seed planters of this type, seeds have been held in a ply of non-woven material such as wadding, and the material has been held together by a ply of paper on one side thereof or two plies of paper, one on either side thereof, the paper and material being of a type which will rot away when embedded in the earth leaving the seeds planted therein. In other cases the seed carrier has been a water soluble gum starch or resin which readily disintegrates.

One of the objects of this invention is to provide a seed planter in which the seeds will be definitely arranged in a certain pattern such as in rows with spaces between the location of the seeds, and in these spaces to provide a means which will prevent growing of weeds, thus allowing the seeds which are carried in the layer of non-woven material to have greater access to the nutriments of the soil.

Another object of the invention is to eliminate the layer or layers of paper used for securing the non-woven material together and utilizing a bond material which will hold the non-woven material together, and at the same time, this bond may act to prevent the growing of weeds in the spaces which it covers.

Another object of the invention is to provide a shield for sun light to retard in certain areas the growth of weeds.

Another object of the invention is to form this bond of either water soluble or water insoluble material and locate the different bonds in the article as may be most advantageous.

Another object of the invention is to provide a film on the seed carrier which will serve to retain heat below it and act somewhat as a hothouse for the maintaining of moisture in the ground preventing it from drying out of the ground.

With these and other objects in view, the invention consists of certain novel features of construction as will be more fully described and particularly pointed out in the appended claims.

In proceeding with this invention, we provide a carrier for seeds in the form of sheet material, an example of which may be cotton wadding as it is a common and inexpensive form of body and use this non-woven material as a carrier for seeds, fertilizer, mulch or any other beneficial ingredients which may be desirable for the better growing of the seeds. These seeds may be distributed in patterns such as rows as desire may dictate. A non-woven material of the type here referred to does not have a great deal of strength, and therefore, in order to make this material so that it may be handled or rolled out on the ground, some sort of a binder must be provided to hold the non-woven fibers together. This binder may be either in a form which is soluble in water or non-soluble in water depending upon the results desired or the binder may be both water soluble and water non-soluble in different locations depending upon the results desired. This binder also may be either in the form of particles which are contained in the non-woven material and these particles so treated that they are adhered together or bonded or the bond may be in the form of a film existent on one or both of the surfaces of the non-woven material or a separate film may be added and adhered to the material, and this invention also contemplates the use of the bonding material either transparent or opaque and the use of such a bond in such locations that the bond may control the growth of the seeds which are carried in the non-woven material and the growth of weeds in the spaces between the seeded areas. Thus, there may be provided a transparent area of bonding in the seeded area and an opaque or non-transparent bond in the areas or spaces between the seeds, and thus this bond serves a double function of not only holding the non-woven material together but also of controlling growth.

Another example of seed carrier is a sheet of paper or a resinous film with seeds adhered thereto or held on the sheet by a coating in the desired pattern. The areas between the seeds may have treatment to cause the area to be transparent or opaque as desired either by incorporation in the sheet or by film added thereto where an opaque situation is desired.

Figure 1:
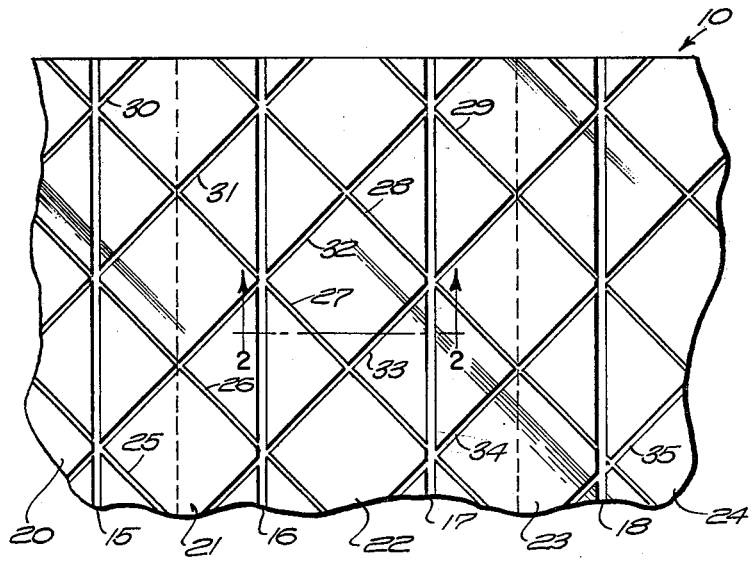
FIGURE 1 is a top plan view of a sheet-like article constructed in accordance with this invention.
Figure 2:
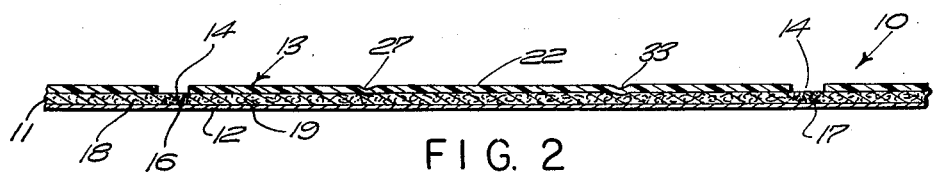
FIGURE 2 is a section on line 2—2 of FIG. 1 on a greatly enlarged scale.

With reference to the drawings in FIGURES 1 and 2 there is shown an example of the invention in which 10 designates generally a carrier comprising a multi-ply sheet embodying this invention. The ply 11 is of non-woven material such for example as cotton wadding. The ply 12 is of thin paper and the ply 13 is of a material which is non-soluble in water such as a very thin resinous material, for example polyethylene. The non-woven ply 11 which is the body of the article contains seeds 14 which in the present instance are located in rows as may be seen in FIGURE 1, such as 15, 16, 17 and 18 extending lengthwise of the carrier which will usually be in a roll form. In the spaces between these rows of seeds, there may be contained in the non-woven material fertilizer in small particles as at 19, and this fertilizer may also occur in the seeded area 14. Mulch or any other ingredient may be added to or substituted for the fertilizer 19 as may be desired for the better growth of the seeds which are incorporated in the non-woven material 11.

On the lower or underside of the ply 11 of non-woven material there may be a ply of paper 12 of a very thin character and it, together with the non-woven material may be of such a character as to quickly rot when the sheet is laid on or imbedded in the ground. This paper serves as a bond for the non-woven material but being on the bottom surface is relatively unimportant in this invention as it performs no other function than as a bond in this location. In FIGURES 1 and 2 an additional bond has been provided for the non-woven material which we have here shown as in the form of a separate added thin film designated generally 13 and provided in strips 20, 21, 22, 23 and 24 and so forth, which are laid on the upper surface of the non-woven material 11 with their edges spaced at the location of the seeded areas such as rows 15 to 18, thus leaving the seeds 14 in these rows free to grow unobstructed by the film of binder which is located between the rows. This bonding film in the present instance may be of a resinous material such as polyethylene and will be bonded to the non-woven material 11 in any suitable way. However, one manner of bonding may be by rolling a heated roller over the surface of the bonding film so that along the lines contacted by the roll the film of material will be melted sufficiently to cause its undersurface to be adhesive and this adhesive secured to the non-woven fibers in the layer 11. We have shown the lines of movement of the hot roll as 25, 26, 27, 28 and 29 in one diagonal direction and the lines 30, 31, 32, 33, 34 and 35 at right angles thereto in the other diagonal direction. The indentations of these roller lines are shown in FIGURE 2 at 27 and 33 where they are indented somewhat below the upper surface of the ply 13 as there shown. This bonding secures the non-woven material together so that it may be handled in rolls and rolled out on the ground without tearing apart.

Figure 3:
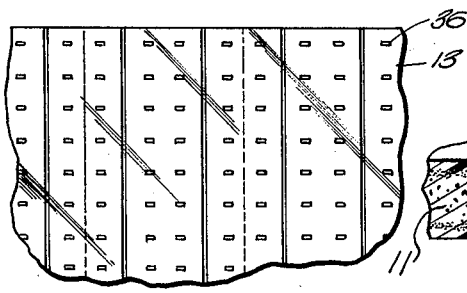
FIGURE 3 is a view similar to FIG. 1 but showing a modified arrangement of securing a resinous film in position on the non-woven material.

In some cases instead of rolling a hot roll to form adhesive areas, a plurality of spots such as 36 shown in FIGURE 3 may be adhered to the nonwoven material 11 which will serve the same purpose of bonding the fibers together throughout the film of material 13.

Figure 4:
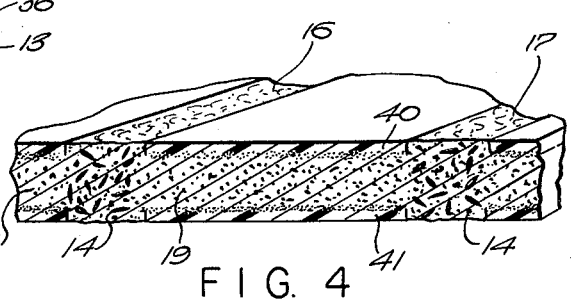
FIGURE 4 is a sectional view somewhat in perspective illustrating a non-woven material which has a resinous film formed on its opposite surfaces from solid resinous particles distributed in the non-woven material.

In FIGURE 4 we have illustrated an article in which instead of having a film of material such as polyethylene laid over the upper surface of the non-woven material there are particles such as powder or fibers of a bonding material mixed in with the fibers of the non-woven material body 11 and which are present to such an extent that upon rolling a hot roll over the surface of the non-woven material, these bonding particles may be melted sufficiently to in effect form a film on the surfaces at the area contacted by the roll and in FIGURE 4 we have shown areas 40 on the upper surface and 41 on the lower surface which represent the contact surface of a hot roll which has been moved over the surface sufficiently slowly so that the particles which are contacted by the hot roll are melted together to form a film such as 40 which will be adhesively secured to the non-woven layer 11 which carries the seeds 14, fertilizer 19 and so forth. In this case, of course, there is no paper on the underside as the bonded particles provide the necessary bonding below the upper surface. The seeded areas 15, 18 are left unbonded.

Figure 5:
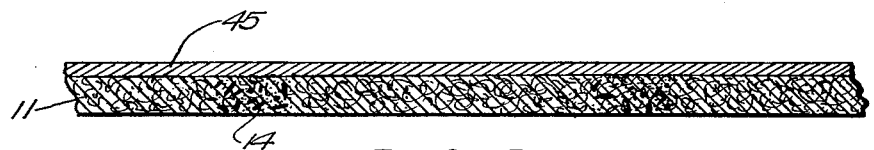
FIGURES 5 to 12 are sectional views on a somewhat larger scale showing modified forms of the invention.

The resins which have been contemplated above both of film and fibers are of a non soluble in water type such for instance as polyethylene or polyvinyl chloride or some of the acrylic resins. However, in some cases it may be desirable to have a resin in which the bond is water soluble, an example of which would be a bond of methyl ether of cellulose, sodium carboxy methyl cellulose, hydroxy ethyl cellulose, polyvinyl alcohol or styrene-maleic acid copolymer or some form of starch, dextrin, or some such substance and in FIGURE 5, we have illustrated non-woven material 11 which has been all over covered with a water soluble coating 45 which may be either sprayed on or applied as a film. In the former case as it hardens, it will adhere to the nonwoven fibers, while in the latter case the film will be softened to adhere to the non-woven material. In this entire construction the water will dissolve the binder shortly after it has been laid on the ground and the seeds will remain in the rows in which they have been positioned, the body material 11 being of such a character that it will rot as previously mentioned.

Figure 6:
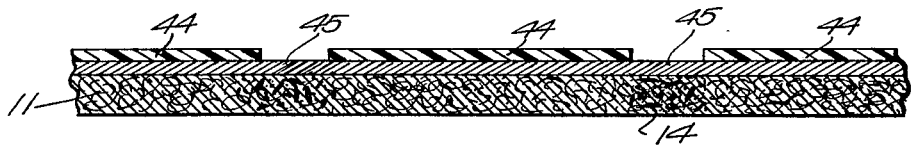

In the showing in FIGURE 6 we have provided a water soluble binder as at 45 which coats the entire carrier 11 in which seeds are located. Additionally a water soluble binder which will be in the form of a film is provided in the spaces between the seeded area, but will not cover the area where the seeds are but will leave the water soluble film exposed. The body 11 of non-woven material may be the same as heretofore provided and may be partially held together by the bond of the fibers which have not become so liquid as to form a film. The melted particles may form a globule about crossed fibers to hold them together or form a coating about fibers and the coating of two such coated fibers adhered to form a bond to hold the non-woven material together.

Figure 7:

In the showing in FIGURE 7 the non-woven fibers 11 have been compressed as at 11' in the areas between the seed locations 14 and this area 11' comprises in addition to the usual body of non-woven material some particles 46 of a water insoluble material which will upon compacting and some heating be secured together so as to maintain the compressed material 11' bonded together in its compressed form to hold the sheet together.

Figure 8:

In FIGURE 8 a compressed situation is also provided in which there is a water insoluble fiber in the compressed non-fibrous material 11' as indicated at 46 while there is a water soluble binder as at 47 which holds the seeds 14 and the water soluble binder may be readily dissolved upon the laying of the finished article in the soil. The compacting of the material 11' also assists in holding the material in a more intimate form so that it will have greater strength for handling.

Figure 9:

In the showing in FIGURE 9 the body of non-woven material 11' is shown compacted and bonded together by the attachment of different fibers such as water soluble particles 47 and along the lower surface of this compacted non-woven material there are provided seeds 48 which are adhesively secured to the undersurfaced by any suitable adhesive, and in some cases there may be also provided a coating 49 over these seeds to hold them in position.

Figure 10:

In the showing in FIGURE 10, we have provided a sheet carrier 50 comprising a material which will disintegrate in the ground either by reason of its being one of the water soluble resins above-mentioned or by reason of its being paper which will rot in the ground, and upon this sheet carrier, we apply a coating of some adhesive 51, such for instance as a polyvinyl alcohol or a starch, and then apply seeds 52 in the desired pattern with spaces between seeds and in the spaces between the seeds there will be provided a water insoluble film, such for instance as by printing on a fluid or semi-fluid material or laying on a film 53 which will contain a sun's ray retarding pigment.

Figure 11:

In some cases instead of there being applied to the sheet 50 as shown in FIGURE 10, we may utilize a construction such as shown in FIGURE 11 in which the seeds 52 will be placed on the surface of the sheet in the desired pattern and then there will be a covering 54 over the entire sheet and seeds which may be a film but preferably would be sprayed on. This covering would be of the water soluble type, and after this covering is applied, then there will be applied the water insoluble coating which may be a solid film or may be in liquid form printed on in the spaces between the seeded area as shown in FIGURE 11 at 53 the part which will carry the sun's rays controlling material.

Figure 12:
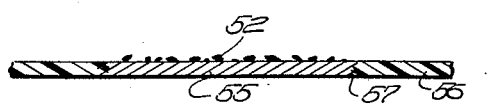

In the showing in FIGURE 12, there is a sheet illustrated of a composite material, there being shown in one area 55 a water soluble resin while in another area 56 there is shown a water insoluble resin. These two types are joined together by a sort of intermingling or welding operation or one that may come about by printing the two forms in close adjacency so that they will merge together before they are hardened or the sheet may take the form of different solid pieces welded together at the junction 57. On the water soluble resin area 55 seeds 52 will be adhered either by laying them on to the sheet while the sheet is in a softened state or through some of the adhesive methods described above in connection with FIGURE 10.

In order to control the growth of the plant life and particularly for retarding the growth of weeds and the like, we will insert into the binder or added covering which may exist as a film on the surface of the planter a pigment to retard the passage of sun rays. A black pigment is most effective in this regard to cause the covering or binder to be opaque to prevent or materially retard the passage of the sun's rays, thus retarding the growth of weeds in the area where the seeds are not located, such as between the rows of seeds as shown in FIGURE 1. This color also serves to absorb and retain heat which is beneficial to growth of the seeds. In the areas where it is desired to control the passage of the sun's rays, the covering or binder in which the pigment is used will be of the non-water soluble type so as to maintain the rays blocking characteristics for a useful length of time. This sun's rays barrier may be of paper, resin, film, or any material.

Some film such as polyethylene films which may be used will permit the passage of gases, whereas some film such as a polyvinylchloride film will not permit the passage of gases and by the selection of a film of the latter character the moisture content of the earth where the planter is used may be controlled so as to retain the moisture in areas where it is desired, such for instance as in the areas where the seeds are located, or this may be retained in the spaced areas between the seeds as this moisture will re-enter the soil and reach the seeds.

We claim:

1. A seed planter comprising a flexible carrier with seeds secured to said carrier in a predetermined spaced pattern relation, said carrier comprising a ply of non-woven fibrous material bonded by a water insoluble resinous film secured to the non-woven material.

2. A planter as in claim 1 wherein the film is secured to the non-woven material at spaced locations.

3. A planter as in claim 1 wherein the film is of a material to retard the sun rays in the non-seeded area and a film extends over the seeded area and is of a material to pass said rays in the seeded area.

4. A planter as in claim 1 wherein the bonding material in the seeded area is water soluble and water insoluble in the spaces between the seeds.

References Cited in the file of this patent

UNITED STATES PATENTS

| | | |
|---|---|---|
| 1,971,504 | Pratt | Aug. 28, 1934 |
| 2,309,702 | Kirschenbaum | Feb. 2, 1943 |
| 2,323,746 | Woolf | July 6, 1943 |
| 2,648,165 | Nestor | Aug. 11, 1953 |
| 2,826,570 | Ivett | Mar. 11, 1958 |
| 2,826,865 | Chohamin | Mar. 18, 1958 |
| 2,923,093 | Allen | Feb. 2, 1960 |

FOREIGN PATENTS

| | | |
|---|---|---|
| 107,935 | Australia | July 20, 1939 |
| 1,102,190 | France | May 4, 1955 |
| 488,392 | Great Britain | July 6, 1938 |
| 510,136 | Great Britain | July 27, 1939 |
| 552,448 | Italy | Dec. 3, 1956 |

OTHER REFERENCES

Condensed Chemical Dictionary, fifth edition, published by Reinhold (New York) 1956, pages 848, 883, 1087, 1139 relied upon.